(12) United States Patent
Skoog (10) Patent No.: US 8,584,453 B2
(45) Date of Patent: Nov. 19, 2013

(54) HYDROSTATIC CIRCUIT LOCK VALVE COMPONENTS, CIRCUITS, SYSTEMS, AND METHOD

(75) Inventor: Neil Skoog, Ostrander, OH (US)

(73) Assignee: Atlas Copco Drilling Solutions, Inc., Garland, TX (US)

( * ) Notice: Subject to any disclaimer, the term of this patent is extended or adjusted under 35 U.S.C. 154(b) by 785 days.

(21) Appl. No.: 12/764,388

(22) Filed: Apr. 21, 2010

(65) Prior Publication Data
US 2011/0023477 A1    Feb. 3, 2011

Related U.S. Application Data

(60) Provisional application No. 61/174,796, filed on May 1, 2009.

(51) Int. Cl.
*F16D 31/02* (2006.01)
*F15B 13/04* (2006.01)
*F16K 31/12* (2006.01)

(52) U.S. Cl.
USPC .......... 60/474; 60/461; 91/445; 251/33; 251/43

(58) Field of Classification Search
USPC .......... 60/406, 459, 460, 474, 461; 91/421, 91/432, 445; 251/33, 43
See application file for complete search history.

(56) References Cited

U.S. PATENT DOCUMENTS

| 3,747,351 | A | * | 7/1973 | Wilkerson et al. | 60/476 |
| 5,826,486 | A | * | 10/1998 | Shimada | 60/460 |
| 6,742,438 | B2 | * | 6/2004 | Kim | 91/445 |

* cited by examiner

*Primary Examiner* — Michael Leslie
(74) *Attorney, Agent, or Firm* — Robert O. Groover, III; Malcolm W. Pipes; Gwendolyn S. S. Groover (57) ABSTRACT

Methods and systems for operating a cylinder lock valve to control fluid flow to a hydraulic cylinder operating a drilling rig sub-system. The lock valve 1) allows fluid flow through the valve if pressure on a main and pilot area overcomes a closing spring force on the valve, or 2) blocks flow through the valve if a loss in charge pressure in the main and pilot area falls below the closing spring force on the valve.

4 Claims, 7 Drawing Sheets

Diagram 1

FIG. 1

Conventional Cylinder Circuit

- The conventional cylinder circuit utilizing a hydraulic spool valve for directional control and a counter balance valve to prevent the load from dropping.

Differential Cylinder Flow

- Due to the space taken up by the cylinder rod, a smaller volume of oil exits the cylinder then enters it when extending.
- When retracting, there is a larger flow of oil exits the cylinder than enters the area around the rod.
- This is not an issue in the Open Circuit format.

FIG. 2C
(Prior Art)

Closed Circuit Cylinder Function

- When using a hydrostatic pump (over center), the extra flow must be replenished when extending.
  – Sum of flows in and out of main pump must be equal.

Diagram 1

FIG. 3

HYDROSTATIC CIRCUIT LOCK VALVE COMPONENTS, CIRCUITS, SYSTEMS, AND METHOD

CROSS REFERENCE TO RELATED APPLICATIONS

This application claims priority from provisional patent application 61/174,796, filed on May 1, 2009, which is hereby incorporated by reference.

BACKGROUND

The present application relates to hydraulic systems, and more particularly to a hydraulic lock cylinder apparatus in hydrostatic circuits in a drilling rig.

When using hydraulic cylinders subject to suspended loads, a counter-balance valve retarding hydraulic fluid flow typically prevents the load from drifting or running away when being lowered. When extending, a bypassing check valve permits reverse flow around the counter-balance valve to allow the cylinder to extend.

When used in hydrostatic circuits, the counterbalance valve generates heat that is difficult to dissipate, and the counterbalance valve also requires external energy to operate. To lock cylinders in place on mobile equipment with a suspended load, a manual or counterbalance lock valve positioned between the cylinder and a directional valve typically prevents hydraulic leakage from the cylinder.

Figure 2A:
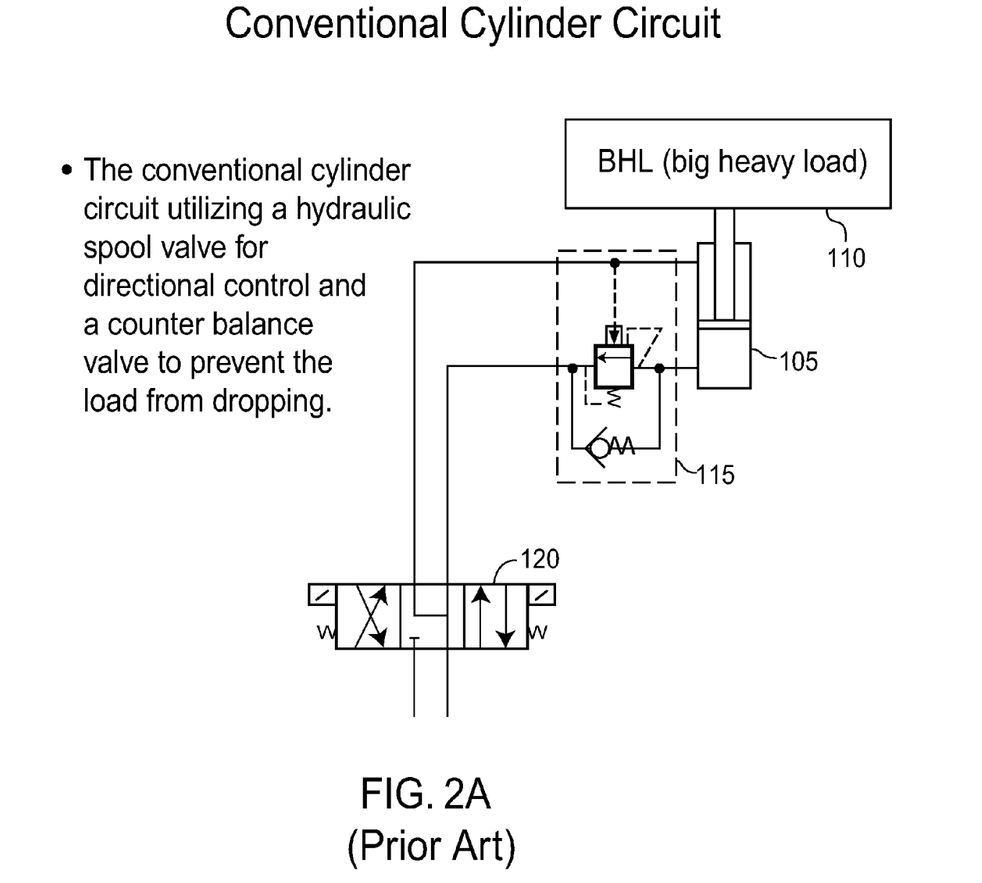
FIG. 2A shows a prior art hydrostatic circuit with a counterbalance and a directional control valve.
Figure 2B:
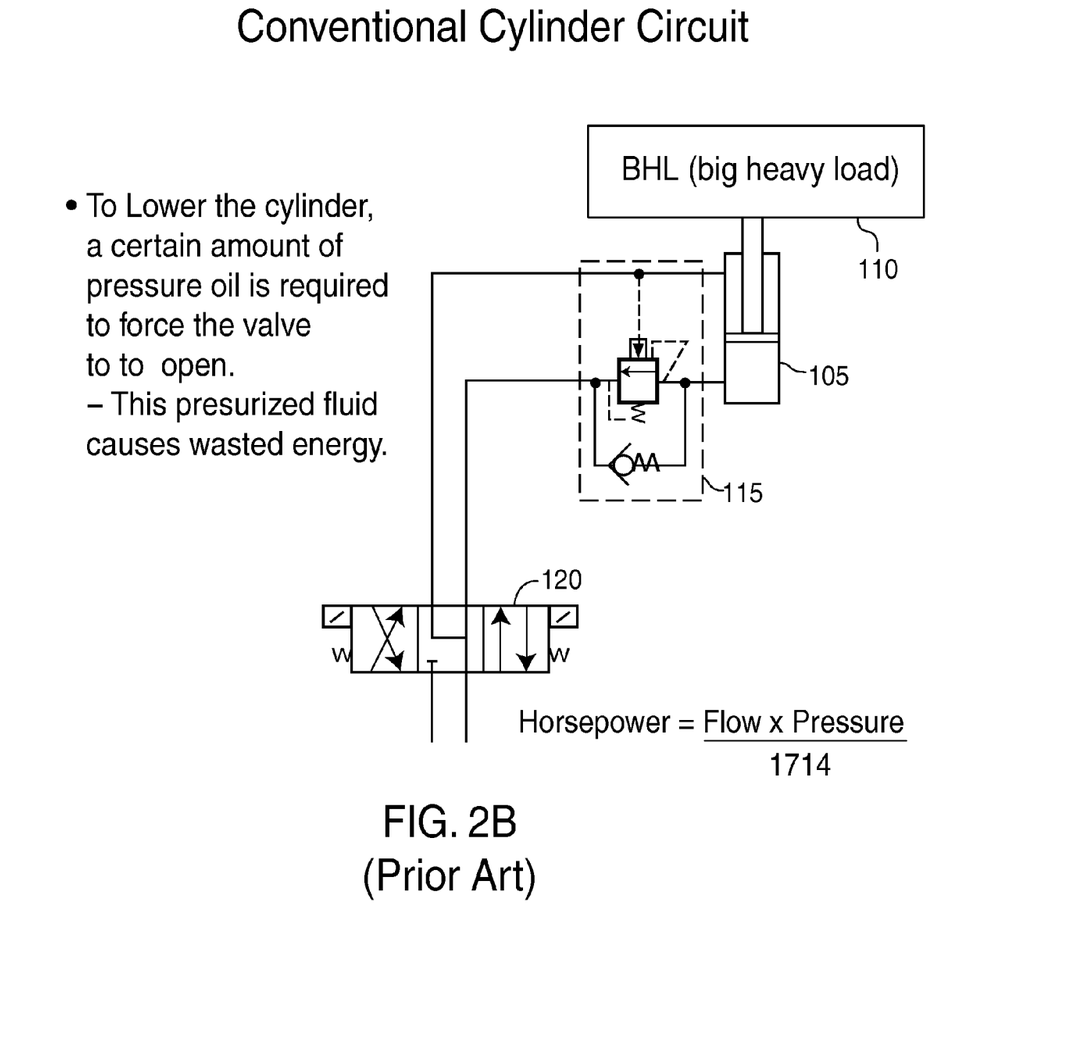
FIG. 2B shows operation of the prior art hydrostatic circuit FIG. 2A requiring pressurizing the counterbalance valve.

A prior art configuration using a hydraulic spool valve for directional control and a counterbalance valve to prevent runaway is shown in FIG. 2A-D. In FIG. 2A the hydraulic cylinder 105 supports a big heavy load 110, which can induce considerable pressure in the hydraulic cylinder 105. The counterbalance valve 115 is a special type of pilot controlled check valve used to control flow, and the hydraulic spool valve 120 functions as directional control for the fluid flow. In FIG. 2B, to lower the load 110, the counterbalance valve must be pressurized by the hydraulic fluid to open the counterbalance valve 115 so hydraulic fluid can flow from the hydraulic cylinder 105 and lower the cylinder 105. The pressurized fluid causes wasted energy.

Figure 2C:
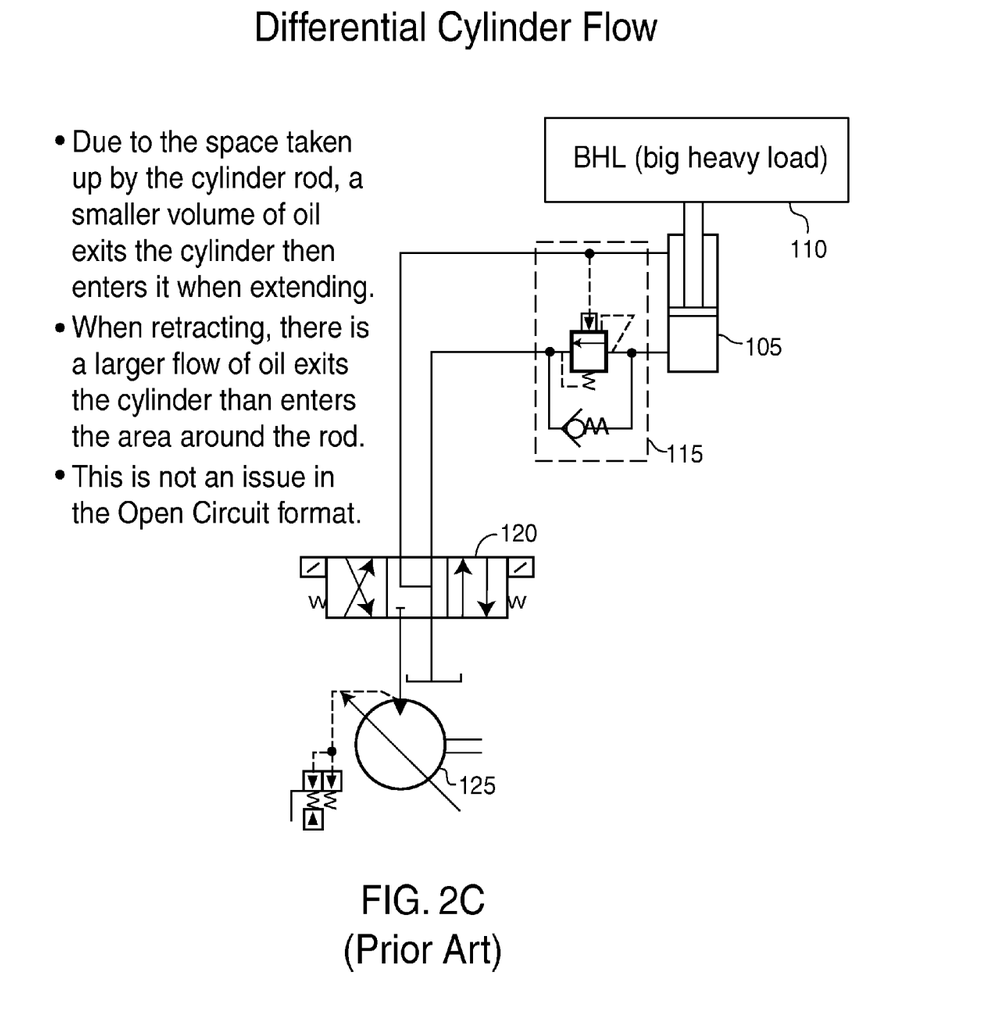
FIG. 2C explains the differential cylinder flow problem in the prior art prior art hydrostatic circuit FIG. 2A.

Another difficulty in prior art systems, as shown in FIG. 2C, is handling differential cylinder flow. There is a volume difference in the hydraulic cylinder 105 due to space taken up by the cylinder rod 108. The volume in the rod section 109 is less than in the cap end 107. A smaller volume of hydraulic fluid exits the cylinder 105 than enters it when extending. A larger volume exits the cylinder 105 than enters it when retracting. In closed circuits, an auxiliary pump 125 is used to remove or add fluid to the system to compensate.

Figure 2D:
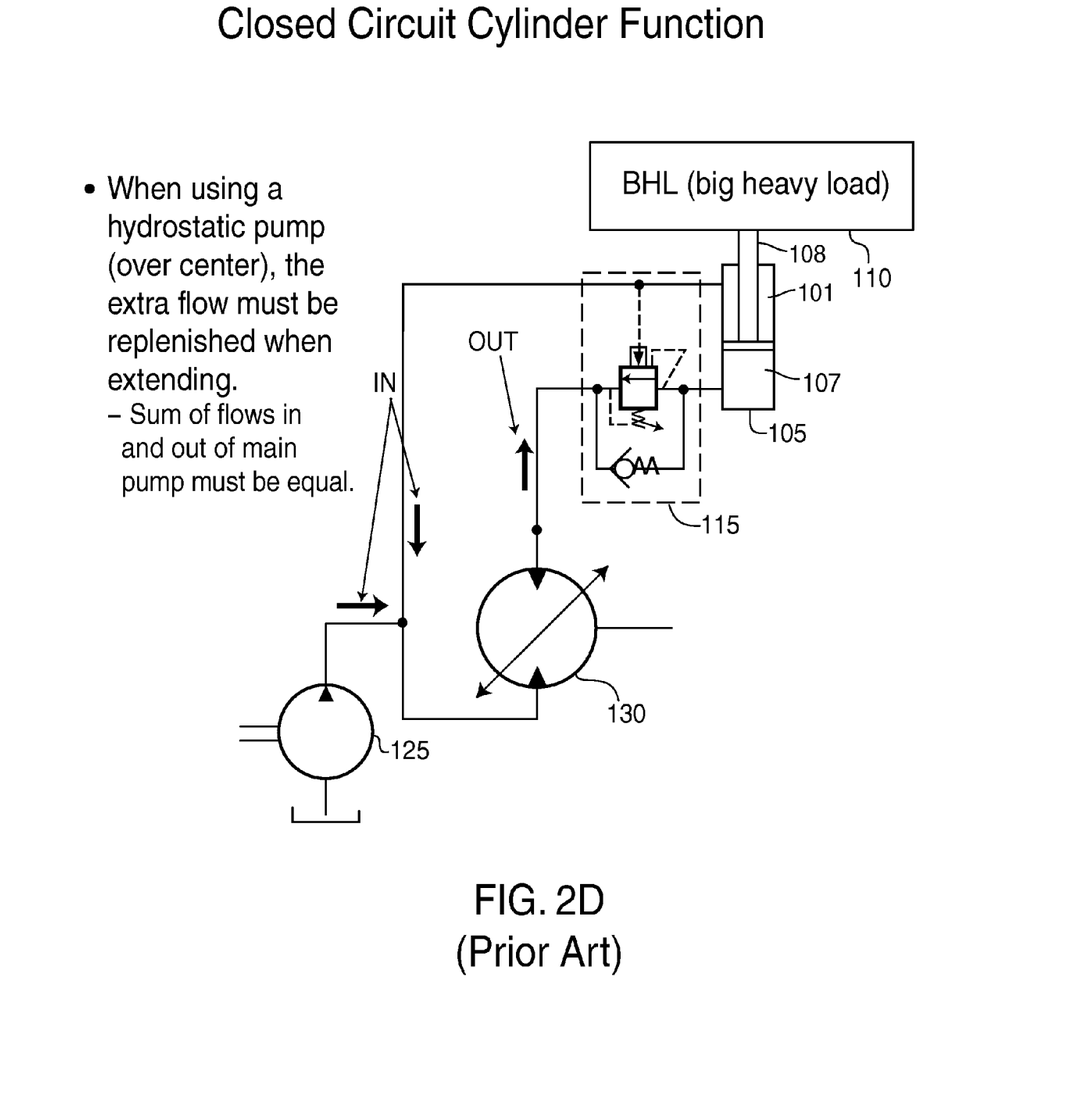
FIG. 2D shows a configuration for extending a load in a closed circuit system of FIG. 2A.
Figure 2E:
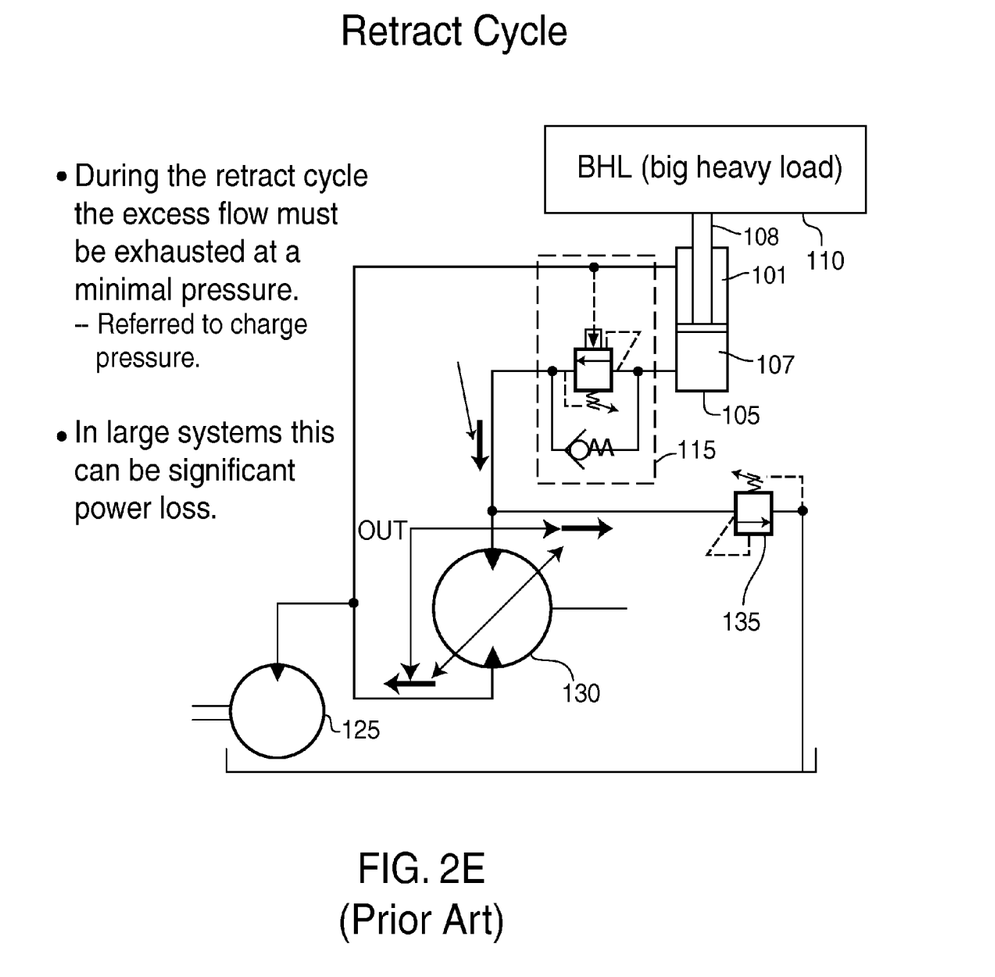
FIG. 2E shows a configuration for retracting a load in a closed circuit system of FIG. 2A.

FIG. 2D shows a configuration for extending a load in a closed circuit system using a hydrostatic pump (over center). When using a hydrostatic pump (over center) 130, the extra flow required in the large cap end 107 must be replenished. The auxiliary pump 125 pumps fluid back into the system to make up for the differential cylinder flow, with the counterbalance valve 115 closing if pressure drops to prevent a runaway cylinder. The sum of the hydraulic fluid in and out of the main pump 130 must be equal FIG. 2E shows a configuration for retracting a load in a closed circuit system using a hydrostatic pump (over center). When using a hydrostatic pump (over center) 130, the excess flow from the large cap end 107 must be exhausted at minimal pressure (e.g., charge pressure). The auxiliary pump 125 pumps fluid out the system to make up for the differential cylinder flow, with the counterbalance valve 115 closing if loss of pressure occurs to prevent a runaway cylinder. A second counterbalance valve 135 is required to help control flow and stop backflow in the event of loss of pressure in an exhaust circuit, as the main pump 130 also pumps fluid through the system.

In summary, the nature of the hydrostatic circuit in normal operation provides the necessary braking action to prevent the cylinder from running away. During normal operation of a hydrostatic circuit, a charge pressure is present in the main working lines. However, failure of a main fluid conductor or damage to the pump can cause a loss of charge pressure, which can result in an uncontrolled retraction and a run away cylinder. The loss of charge pressure when heavy loads are present can result in catastrophic damage.

SUMMARY

The present application discloses new approaches to operating a hydrostatic circuit in a drilling rig more efficiently to avoid heat build-up and wasting energy.

In some embodiments, the inventions include a cylinder lock valve sensing the charge pressure of a hydrostatic circuit to open so as to allow minimal back pressure and prevent subsequent heat generation. If a loss of charge pressure occurs, the cylinder lock valve closes to provide dynamic braking to stop hydraulic cylinder retraction. A secondary signal to the lock valve can provide a positive lock even when charge pressure is present. The cylinder lock valve can be used on the hydrostatic systems in the rig, such as to raise the drilling mast or raise or lower the top-drive on the drilling mast.

The disclosed innovations, in various embodiments, provide one or more of at least the following advantages. However, not all of these advantages result from every one of the innovations disclosed, and this list of advantages does not limit the various claimed inventions.

Automatic braking control preventing cylinder runaway.
Simpler design, eliminating the need for a counterbalance valve.
Less heat build-up.
Less energy wasted.
Increased safety.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

Figure 1:
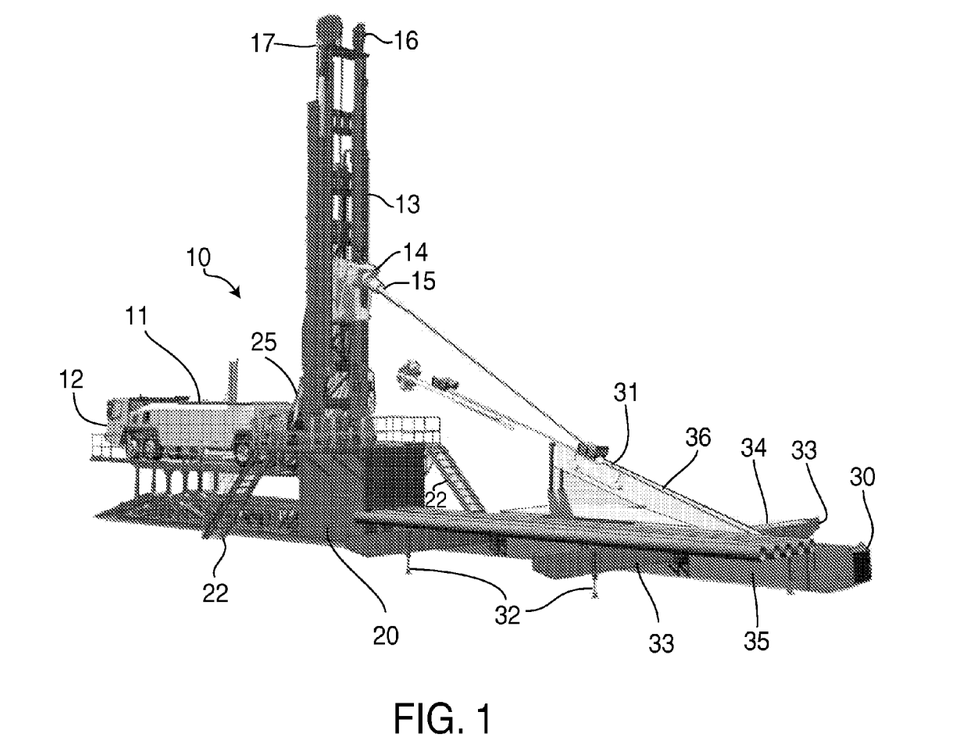
FIG. 1 schematically shows a drilling rig compatible with the inventions.

The exemplary drilling rig depicted in FIG. 1 is a new generation drill for the oil and gas industry. This innovative drilling rig system includes three primary structural components: a mobile rig (10), a substructure (20), and a pipe handling skate (30). The three components are designed to provide a modular, highly mobile drilling system, offering improved drilling performance, lowering operating cost, and enhancing safety. The modular drilling system exhibits exceptional mobility with vastly reduced rig-up time, greatly reducing non-drilling time and cost, improved performance, greater energy efficiency, and enhanced safety in all facets of operation.

The exemplary top-drive rig possesses an actual working hook load capacity of 200,000 lb (90,719 kg) and the flexibility to drill vertical, directional and horizontal wells. In most prior art systems, the rigs can only perform actual drilling operations for approximately half the time it is deployed for a drilling assignment. These older designs rig spend the remainder of the time mobilizing, rigging up, handling pipe, and standing by while other operations occur. This design focuses on reducing non-drilling time and costs, increasing operating performance, and enhancing safety.

Enhancements of this design include a virtually hands-free breakout and pipe handling system 31 requiring minimal manual intervention and eliminating the need for personnel in the mast during drilling operations. Another enhancement includes a hydraulic floor crane on the substructure 20 assisting rig up and drilling operations, which reduces heavy lifting and additional manual intervention The exemplary drilling system can be utilized in a mixed fleet approach which permits land-based drilling to capitalize on the strengths of two types of drilling rigs: lightweight mobile rigs and deep-hole conventional rigs. The lightweight hydraulic top-drive exemplary rig drills surface holes and pre-sets casing. The larger rig follows on and drills the deeper segment of the well, which allows both rigs to perform at maximum efficiency. Each rig completes its portion of the drilling plan in the least amount of time and at the lowest possible cost. This approach results in a considerable savings in mobilization costs, rig-up time, setting surface casing, tripping pipe, and rig down.

Component Overview
Hydraulic Carrier Drive

The exemplary drilling rig shown in FIG. 1 uses a unique single-engine hydraulic carrier-drive system 11 to power the rig's existing systems. The carrier 11 design possesses a full-width, low-profile cab 12 with all of the amenities found in conventional trucks. A single 950 hp (708 kw) engine powers both the carrier and the drilling rig's hydraulic and electrical systems utilizing shared components rather than a second engine plus drive train. This unique design greatly reduces weight as well as time and cost for maintenance.

In drive mode, the engine consumes less than half of its rated power and is capable of full torque at any time, regardless of speed. The hydraulic drive, coupled with a clutch and manual transmission, provides a wide range of power and speeds, equally effective on flat land or mountainous terrain. A dynamic braking system provides both improved quiet and efficient operation compared to conventional braking systems. The carrier 11 also possesses a creep mode feature that gives the driver precise control and vehicle placement in off-road or extreme driving conditions.

Mobile Drill Rig

The disclosed exemplary rig 10 is a mobile, self-contained rig with a 200,000 lb (90718 kg) hook load capacity. It incorporates a unique telescopic mast 13 that reduces overall rig-transport length while maintaining the capability to handle both pipe and casing. The pipe handling and breakout system 31 is virtually hands free. Its dual-range hydraulic top-drive 14 tips out to handle drill pipe and casing with a 0° to 90° tip out design. The rig also possesses an integrated iron roughneck 21 and hydraulic slips. The drill operator can set a top-drive torque limit control to a maximum torque limit so that every joint of pipe and casing is made up to exact specification. The design allows the rig to push, pull, rotate, and flush tubulars.

The mast 13 and substructure 20 are engineered to API 4-F with a 3 to 1 safety factor over maximum hook load. A hydraulic cylinder hoisting and pulldown system provides high mechanical and hydraulic efficiency, which may reduce operating cost. The hoisting and pulldown system operates using a dual hydraulic cylinder feed and hoisting configuration. Cables 17 reeved over large diameter traveling sheaves 16 raise the top-drive 14 to the top of the mast 13 at maximum extension. The electronic control system is designed to be precise and reliable. An "on demand" hydraulic system allows the driller to allocate power to various drilling systems as needed. This capability can improve drilling performance and reduce operating cost. The operator's console and monitor can be placed either on the work floor or in a drill cabin. The rig provides the operator with real-time surface and down-hole information to maximize drilling performance at all times.

Substructure

The rig substructure 20 serves as a strong, structural base for the rig and makes up an integral part of the drilling system. The substructure design allows rapid rig up with reduced manual labor and assembly. The substructure 20 includes as integrated components the table, master bushing, hydraulic slips, and iron roughneck 21. Four hydraulic blocking jacks permit simple, fast leveling. A self-contained electric-hydraulic power pack system deploys the drive-on ramps and catwalks on the substructure. The blowout preventer (BOP) stack can be transported with the substructure. A hydraulic crane, with a telescoping boom, assists with rig up and utility lifting during drilling operations. A remote controlled crane boom can be positioned over hole center or can reach off the work floor to pick up loads from the ground. The main air/mud manifold is also located on the substructure for quick ground level hook up.

The substructure forms a large 190 ft$^2$ (17.6 m$^2$) work floor designed to provide ample working space and configured with drill-crew efficiency and safety in mind. Two access stairways 22 hinged at the top can adjust to substructure height, while keeping the bottom end firmly on the ground. Because the substructure 20 comprises a single load, deployment requires less assembly and manual labor than prior art substructures, reducing non-drilling time and cost.

Skate

The rig's skate 30 forms a complete pipe handling system designed to work with the rig 10 and substructure 20. It comprises a single skid-mounted load attached directly behind the substructure 20. The skate design allows handling of drill pipe, collars, and casing. The skate 30 can handle 30 ft (9 m) or 40 ft (12 m) oil field drill pipe as well as lengths of casing up to 24 inches (610 mm) in diameter. Hydraulic jacks 32 make set up and alignment quick and simple. The skate possesses foldout pipe racks 33 on both sides to store pipe 34 and casing 35. These racks 33 use hydraulic jacks so pipe will roll onto the skate when drilling and off the skate when tripping out. Alternatively, the skate configuration can omit racks and use hydraulic pipe tubs or simple A-frame racks to load and unload the skate.

The control system for pipe handling can be located on the work floor and/or at ground level. An operator handles the loading operation on the skate and elevates the pipe to a fixed position behind the work floor on a trough 36. A hydraulic clamp on the end of the trough 36 grips the pipe, and the clamp extends to meet the spindle 15 for make up. After the joint is made up, the operator opens the clamp and retracts it into the trough 36. The operator then lowers the trough 36 and loads the next pipe 34 or casing 35 from the racks 33. A big advantage of this totally automated pipe handling system is the ability to maintain a constant, fast pipe-handling speed without tiring crewmembers.

The disclosed integrated drilling system offers contractors a lightweight, mobile package that can be mobilized and rigged up quickly. It can drill vertical, directional, and horizontal exploration and production wells in the 6,000-10,000 ft (1800-3000 m) depth range, and can handle drilling and casing surface and intermediate holes for deeper wells.

The hydrostatic circuit disclosed herein, lacks a directional valve and a counter-balance valve. The hydrostatic circuit functions using a two-way bidirectional hydrostatic pump providing a charge pressure on a hydrostatic circuit. A lock valve is used to control fluid flow to a hydraulic cylinder and lock the cylinder if charge pressure is lost.

Description of the Cylinder Lock Valve

The cylinder lock valve possesses an active area logic element with a spring in a spring chamber designed to exert adequate closing force against the annular area of the logic element (i.e., a pilot area). When adequate charge pressure is present in the hydrostatic circuit, pressure on the main and pilot areas exerts an adequate force to overcome the spring force exerted from the spring chamber to open the valve. During normal operation, the spring chamber of the valve drains to the reservoir. To provide a secure closing force, the spring chamber can be pressurized to exert adequate spring force to close the valve and keep it closed.

Description of Typical Operation

Figure 3:
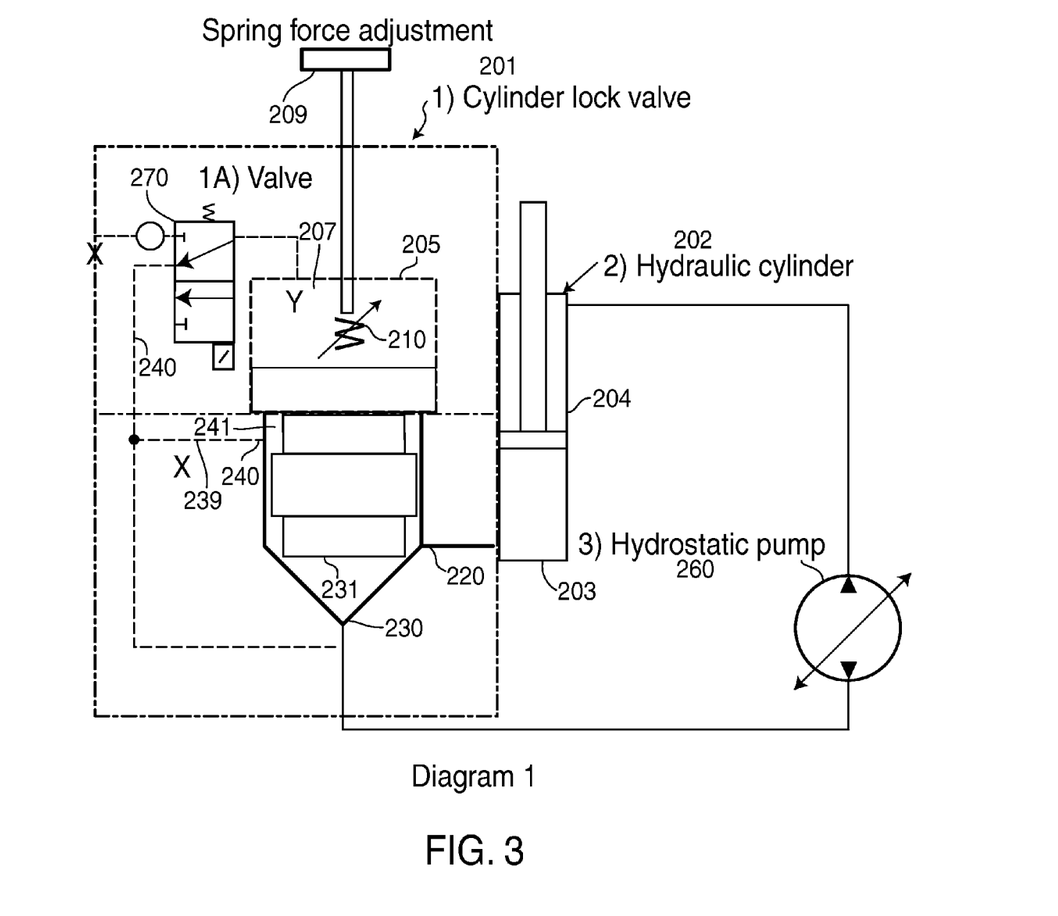
FIG. 3 schematically shows a cylinder lock valve incorporated into a hydrostatic circuit.

In one embodiment, the cylinder lock valve (1) 201 is mounted directly on the cap end 203 of a hydraulic cylinder (2) 202. The spring force adjustment 209 to the spring 210 housed by the spring chamber 205 provides the necessary holding pressure (i.e., closing force) in the "B" cylinder port 220 of the cylinder lock valve 201 to prevent hydraulic fluid from escaping, holding the loaded hydraulic cylinder 202 in place. The "B" cylinder port 220 connects to the cap end 203 of the hydraulic cylinder. Fluid from the hydrostatic pump (3) 260 acting on the large area 231 of the "A" port 230 is also sensed in the logic area 241 of the "X" pilot port 240 of the cylinder lock valve (1) 101. Connection 239 couples the "X" pilot port 240 and logic area 241 to the "A" port 230.

Hydraulic fluid causes the valve 201 to open, allowing the hydraulic fluid to flow into the hydraulic cylinder (2) 202 through port "B" 220 into the cap end 203. When adequate hydrostatic charge pressure is present, the force of the charge pressure working against the "A" 230 and "X" 240 ports, respectively, overcomes the downward spring force, opening the valve.

When retracting the cylinder 202, the load on the cylinder 202 causes the cylinder 202 to lose pressure and retract as hydraulic fluid flows out of the cylinder 202 while maintaining sufficient charge pressure to keep the lock valve 201 open. The load on the cylinder 202 then induces a pressure in the hydraulic line between the cylinder 203 and the pump 260. If the displacement control valve of the pump 260 is set to accept the fluid, the cylinder 202 will retract. Otherwise, the cylinder 202 will remain in place.

When extending the cylinder 202, the pressure at the cylinder lock valve 201 exceeds the pressure in the cylinder 202, resulting in fluid flow into the cylinder 202 causing extension. However, if charge pressure is lost, the spring force is not opposed and the valve 201 can close, locking the cylinder 202 in place by blocking ports "A" 230 and "B" 220.

The displacement control valve of the hydrostatic pump 260 determines the retraction speed of the cylinder 202 and load. The hydrostatic pump 260 supplies a relatively constant charge pressure in the system. Without the control valve, the hydrostatic system essentially consists of the pump 260, actuator (e.g., cylinder 202), and lock valve 201. The hydrostatic pump 260 functions as a two-way dedicated pump, pumping fluid into or out of the hydrostatic circuit. Raising or lowering a load involves adding or absorbing hydraulic fluid. Pressure may change due to the resistance of the fluid flow or added weight of the load.

To raise a load, the hydrostatic pump 260 adds hydraulic fluid into the system, increasing hydrostatic pressure on the hydraulic cylinder 202 and causing extension of the cylinder 201. To lower a load, the hydrostatic pump removes hydraulic fluid from the system, decreasing hydrostatic pressure on the hydraulic cylinder 202 and causing retraction of the cylinder 202.

To extend the cylinder 202, the hydrostatic pump 260 transfers fluid from the rod side 204 of the cylinder 202 to the cap side 203 of the cylinder 202. To retract the cylinder 202, the hydrostatic pump 260 transfers fluid from the cap side 203 to the rod side 204 of the cylinder 202. The greater the pump displacement setting to transfer the flow to the cap end 203, the faster the cylinder 202 and load extend. The greater the pump displacement setting to transfer the flow to the rod end 204, the faster the cylinder 202 and load retract. Returning the pump displacement control to a zero or blocked condition prevents the load from moving.

Loss of charge pressure causes a drop in pressure at the "A" 230 and "X" ports 240 allowing the spring 210 to close the cylinder valve 201. If the hydraulic cylinder (2) 202 is traveling down when this occurs, and the load induced pressure sensed at "B" 230 exceeds the cylinder lock valve (1) 201 setting (i.e., spring force—("A"+"X")), the valve 201 will open slightly to prevent over-pressurization of the cylinder (2) 202 and provide a positive dynamic braking effort. Once pressure force at port "B" 230 falls below the spring closing force, the cylinder lock valve (1) 201 closes stopping cylinder (2) 202 retraction. The cylinder lock valve (1) 201 remains closed against the load induced pressure present in the hydraulic cylinder (2) 202 sensed at "B" 230 blocking hydraulic fluid flow.

In the event it is necessary to lock the cylinder in position, a directional valve (1A) 270 is actuated, directing charge pressure to the spring chamber area "Y" 207 of the cylinder lock valve (1) 201. The combined spring force and charge pressure working on the largest area of "Y" 207 will securely close the valve to prevent cylinder drifting. This is an added safety failsafe when a heavy load is supported by the charged system. In one embodiment, the spring force is provided by a coil spring 210 with an adjustment 209 to vary the closing force exerted by the valve 201.

The cylinder lock valve can be incorporated in a multi-cylinder system, where two or more synchronized cylinders are used to move a load, and the disclosed lock valve is especially useful where multiple cylinders act together.

Low-mechanical advantage systems lifting heavy loads (>10 tons) and presses (especially those rated >50 tons) also benefit from incorporating a cylinder lock valve.

The cylinder lock valve disclosed can also be used in rotary actuators, such as in a winch or wheel.

The foregoing has described methods and systems for a lock valve in hydrostatic circuits that are given for illustration and not for limitation and uses. Thus the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

According to various embodiments, there is provided: A cylinder lock valve for coupling a hydraulic device, comprising: a pilot area logic element and a compressible force loaded control exerting a closing force on the valve against a first port, wherein the first port allows fluid to act on a main area of the valve opposite the spring; and wherein the lock valve controls fluid flow into a hydraulic device through a second port, with the control and logic area exerting a compressed force sufficient to close the main area preventing fluid flow through the first and second port at less than a charge pressure.

According to various embodiments, there is provided: A hydraulic actuator powered by a hydrostatic circuit, comprising: the actuator coupled to a hydrostatic circuit powered by a two-way hydrostatic pump, with a lock valve controlling fluid flow into the actuator; the lock valve possessing a pilot area logic element and a compressed force loaded control element exerting a closing force on the valve against a first port, wherein the first port allows fluid to act on the main area of the valve opposite the force; and wherein the lock valve controls fluid flow into the actuator through a second port, with the forced loaded control element exerting a force of less than charge pressure insufficient to close the lock valve.

According to various embodiments, there is provided: A method of operating a hydrostatic circuit possessing a lock valve, comprising the steps of: providing a charge pressure, using a hydrostatic pump in a circuit lacking a counterbalance valve and a directional valve, to a hydraulic actuator; providing a lock valve possessing a logic element with a third port opening into a logic area, a compressed control element exerting a closing force to a large area on the valve against a first port, a second port coupled to the actuator, wherein the first port allows fluid to act on the large area of the valve to exert an opening pressure opposite the closing force, and the first and third ports are linked; and coupling the actuator using the lock valve, wherein fluid flows from the first port through the second port into the actuator; wherein the lock valve responds to a charge pressure decrease with the closing force exceeding the opening pressure to close and block fluid flow.

According to various embodiments, there is provided: A hydrostatic circuit possessing a lock valve, comprising: a hydrostatic circuit lacking a counterbalance valve or a directional valve providing hydrostatic charge pressure to a hydraulic machine; the hydraulic machine coupled to the hydrostatic circuit by a lock valve, wherein in the lock valve, hydraulic fluid flows from a first port through a second port into the hydraulic machine, and at a lower than charge pressure a spring control exerts a force sufficient to close the valve to prevent fluid flow through the first and second port.

According to various embodiments, there is provided: A hydrostatic circuit powering a hydraulic device, comprising: a hydrostatic circuit, lacking a counterbalance valve or a directional valve, providing hydrostatic pressure to the hydraulic device at a charge pressure and incorporating a lock valve to automatically close and block fluid flow from the hydraulic device at less than charge pressure.

According to various embodiments, there is provided: A hydrostatic circuit powering a hydraulic device, comprising: a hydrostatic circuit lacking a counterbalance valve or a directional valve providing hydrostatic pressure to the hydraulic device at a charge pressure; and a lock valve positioned at the hydraulic device to automatically close and lock the device in place if pressure falls below charge pressure.

According to various embodiments, there is provided: A lock valve device, comprising: a spring loaded control element designed to provide a closing force against a lock valve, with a first port, a second port, and a third port in the lock valve, and the first port designed to allow fluid to act on a large area part of the valve opposite the spring, and a third port designed to allow fluid to work on an annular area logic element, with the first and third port linked, for coupling so fluid flows between the first and second port at an operating pressure greater than a charge pressure.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The system can utilize an electrical solenoid operated directional control valve to provide positive locking. However, use of remote pressure operated, manual operated, or air operated valves can be used to direct fluid to the drain area to insure and secure valve closing. The system can further be tied to another hydrostatic circuit to direct fluid into the drain area to ensure positive locking in multiple system applications as an added safety feature. Additionally, the directional valve can be used to lock one system while charge pressure is present in another.

The exemplary systems use an on-off type directional control valve to pressurize or vent the spring chamber. The addition of a proportional pressure control can add improved remote pressure control of the closing force.

Additional valving can be located upstream from the "X" port to alter the pressure ratio at port "A" to port "B".

The lock valve relies on internally generated pressure to close the valve in these exemplary embodiments. However, in applications with multiple functions, it may be desirable to obtain control pressure to open or close the valve from a remote source that is influenced by the cylinder travel or from a dedicated pilot system.

A remote pressure control system on the drain area can offer the ability to change the effective setting of the lock portion for circumstances when the load on the cylinder varies dramatically, and it is necessary to reduce or increase the dynamic braking force of the lock valve.

A multiport lock valve embodiment is possible incorporating the principles of the inventions. Circuits incorporating multiple lock valves exhibiting an AND/OR operating relationship are also possible. Another variation could incorporate multiple independent circuits with interconnected lock valve connected in an AND/OR operating relationship.

The hydrostatic circuit embodiment depicted is exemplary only. The cylinder lock valve can be incorporated into any hydraulic circuit, including circuits lacking cylinders.

The lock valve concept is particular useful where heavy suspended loads are encountered, adding to safety and reliability. It is very useful where multiple cylinders are encountered, where the cylinders are mechanically synchronized or otherwise linked to function in unison. In one possible variation, it is possible to have one multiport lock valve operating in multiple system, with a loss of charge pressure in one system causing a pressure drop at the single multi-port lock valve to close off all the connected systems. Similarly, multiple systems can be connected to the common ports, so that a loss in charge pressure in one system causes the lock valve to close off and lock all the systems in place.

The cylinder lock valve can be incorporated and used in pneumatic power circuits as well. Rather than hydraulic, analogous pneumatic systems can utilize the claimed inventions to control gas flow in a pneumatic power system.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A lock valve for coupling a hydraulic device, comprising:
    a pilot area logic element and a compressible force loaded control exerting a closing force on the valve against a first port, wherein the first port allows fluid to act on a main area of the valve opposite the spring; and
    wherein the lock valve controls fluid flow into a hydraulic device through a second port, with the control and logic area exerting a compressed force sufficient to close the main area preventing fluid flow through the first and second port at less than a charge pressure, wherein the lock valve responds to charge pressure acting on the main area at the first port and on the pilot area at a linked third port that increases the pressure against the closing force to open the lock valve and allowing fluid flow through the second port and first port.

2. A lock valve for coupling a hydraulic device, comprising:
    a pilot area logic element and a compressible force loaded control exerting a closing force on the valve against a first port, wherein the first port allows fluid to act on a main area of the valve opposite the spring; and
    wherein the lock valve controls fluid flow into a hydraulic device through a second port, with the control and logic area exerting a compressed force sufficient to close the main area preventing fluid flow through the first and second port at less than a charge pressure, wherein the lock valve responds to charge pressure acting on the main area at the first port and on the pilot area at a linked third port that increases the pressure against the closing force to open the lock valve and allowing fluid flow through the second port and first port, wherein the lock valve responds to a loss in charge pressure acting on the main area at the first port and on the pilot area at the linked third port that reduces the pressure against the spring force to close lock valve and block fluid flow through the second port and first port.

3. A lock valve for coupling a hydraulic device, comprising:
    a pilot area logic element and a compressible force loaded control exerting a closing force on the valve against a first port, wherein the first port allows fluid to act on a main area of the valve opposite the spring; and
    wherein the lock valve controls fluid flow into a hydraulic device through a second port, with the control and logic area exerting a compressed force sufficient to close the main area preventing fluid flow through the first and second port at less than a charge pressure, wherein the lock valve responds to hydrostatic pump pressure acting on the main area at the first port and hydrostatic pump pressure acting on an annular pilot area at the third port that exceeds a downward spring force to open.

4. A hydrostatic circuit possessing a lock valve, comprising:
    a hydrostatic circuit lacking a counterbalance valve or a directional valve providing hydrostatic charge pressure to a hydraulic machine;
    the hydraulic machine coupled to the hydrostatic circuit by a lock valve, wherein in the lock valve, hydraulic fluid flows from a first port through a second port into the hydraulic machine, and at a lower than charge pressure a spring control exerts a force sufficient to close the valve to prevent fluid flow through the first and second port;
    an annular area logic element with a third port opening into the annular area comprising the lock valve, the spring control exerting a closing force to a large area on the valve against the first port; the second port coupled to the hydraulic machine, wherein the first port allows fluid to act on the large area of the valve opposite the spring control exerted closing force, and the first and third ports are linked.

* * * * *